United States Patent
Kraus

(10) Patent No.: US 7,322,569 B2
(45) Date of Patent: Jan. 29, 2008

(54) LINEAR DRIVE FOR VIBRATORY APPARATUS

(75) Inventor: Richard B. Kraus, Barrington, IL (US)

(73) Assignee: General Kinematics Corporation, Crystal Lake, IL (US)

(*) Notice: Subject to any disclaimer, the term of this patent is extended or adjusted under 35 U.S.C. 154(b) by 0 days.

(21) Appl. No.: 10/338,316

(22) Filed: Jan. 8, 2003

(65) Prior Publication Data

US 2004/0129519 A1 Jul. 8, 2004

(51) Int. Cl.
*F16M 1/00* (2006.01)

(52) U.S. Cl. .................. 267/136; 198/766; 198/768; 248/550

(58) Field of Classification Search ............ 198/758, 198/761–770, 750.7, 752.1, 759, 760, 766 X; 188/379, 380, 378; 267/34, 118, 119, 126, 267/136; 248/550, 566
See application file for complete search history.

(56) References Cited

U.S. PATENT DOCUMENTS

| | | | | |
|---|---|---|---|---|
| 2,819,775 A | * | 1/1958 | Everett | ............... 188/378 |
| 2,868,357 A | * | 1/1959 | Thomas | ............... 198/764 |
| 3,089,582 A | | 5/1963 | Musschoot et al. | |
| 3,358,815 A | | 12/1967 | Musschoot et al. | |
| 3,668,939 A | * | 6/1972 | Schrader | ............... 188/380 |
| 3,677,395 A | | 7/1972 | Musschoot | |
| 4,042,230 A | * | 8/1977 | Akimoto | ............... 267/136 |
| 4,149,627 A | * | 4/1979 | Dumbaugh et al. | ......... 198/770 |
| 4,256,014 A | * | 3/1981 | Kroger | ............... 91/216 B |
| 4,495,826 A | | 1/1985 | Musschoot | |
| 4,611,709 A | | 9/1986 | Kraus et al. | |
| 4,617,832 A | | 10/1986 | Musschoot | |
| 4,635,892 A | * | 1/1987 | Baker | ............... 248/550 |
| 5,054,606 A | | 10/1991 | Musschoot | |
| 5,056,652 A | | 10/1991 | Kraus et al. | |
| 5,094,342 A | | 3/1992 | Kraus et al. | |
| 5,131,525 A | | 7/1992 | Musschoot | |
| 5,178,259 A | | 1/1993 | Musschoot | |
| 5,456,341 A | * | 10/1995 | Garnjost et al. | ............ 188/378 |
| 5,666,852 A | | 9/1997 | Musschoot | |
| 5,816,386 A | | 10/1998 | Carlyle | |
| 5,934,446 A | | 8/1999 | Thomson | |
| 6,029,796 A | | 2/2000 | Musschoot | |

(Continued)

FOREIGN PATENT DOCUMENTS

BE 505387 9/1951

OTHER PUBLICATIONS

European Search Report for European Patent Application No. EP 03029880, dated Mar. 31, 2004, 4 pages.

*Primary Examiner*—Christopher P. Schwartz
(74) *Attorney, Agent, or Firm*—Marshall, Gerstein & Borun LLP

(57) ABSTRACT

A two mass vibratory apparatus for processing work material includes a bed defining a transport surface for receiving the objects, an elastic amplifier having a first end connected to the bed and a second end, and a base connected to the elastic amplifier second end. A linear actuator is mounted on the base and adapted to generate a linear vibratory force that is amplified by the elastic amplifier thereby to move the bed in a vibratory motion, so that the work material moves in response to the vibratory motion of the bed.

10 Claims, 2 Drawing Sheets

U.S. PATENT DOCUMENTS

| | | |
|---|---|---|
| 6,155,404 A | 12/2000 | Musschoot |
| 6,237,748 B1 * | 5/2001 | Kroger ....................... 198/763 |
| 6,357,579 B1 * | 3/2002 | Patterson et al. ........... 198/766 |
| 6,622,849 B1 * | 9/2003 | Sperling ..................... 198/533 |
| 2001/0015314 A1 | 8/2001 | Kroger |

* cited by examiner

LINEAR DRIVE FOR VIBRATORY APPARATUS

FIELD OF THE INVENTION

The present invention generally relates to vibratory process equipment and, more particularly, to drives for generating vibratory motion in such equipment.

BACKGROUND OF THE INVENTION

Vibratory process equipment is used in a wide variety of industrial applications. Vibratory feeders and conveyors, for example, may be used to transport granular material, foundry castings, or other objects. Such feeders and conveyors typically include a bed on which the objects are transported and a drive for producing a vibratory motion of the bed which advances the objects in the desired direction. The drive typically includes an electric motor with eccentric weights mounted on the output shaft. In operation, the output shaft with eccentric weights is rotated to generate vibratory force that is transferred to the bed.

Vibratory process equipment may generally be classified as single mass or two mass systems. In single mass systems, the drive is rigidly connected to the bed and the drive/bed combination is isolated from surrounding terrain by an elastic member. In two mass systems, the drive is elastically coupled to the bed, and either the drive or the bed is isolated from surrounding terrain by an elastic member. Two mass systems are preferable in many applications since they are capable of more efficiently producing vibratory movement. Consequently, a smaller motor may used be used in a two-mass system to produce a force having the same amplitude as that of a single-mass system having a larger motor.

The conventional rotating motors produce a rotational force having an unnecessary and undesired force component. Most vibratory process equipment drives the bed in a desired motion. The rotational force produced by rotating eccentric weights, however, generates a force component that is perpendicular to the desired motion. In two mass systems, the drive is coupled to the bed by an elastic member. The elastic member is typically supported so that it has several degrees of freedom in which to move. A spring, for example, has six primary degrees of freedom (i.e., movement along the X, Y, and Z axes and rotation about the X, Y, and Z axes). As a result, the elastic member may be excited in any number of ways other than in the desired motion. The perpendicular force component may therefore excite the elastic member in undesired directions, thereby detracting from the desired motion and reducing efficiency of the system.

In addition, vibratory process equipment using conventional rotating motors have a rotational inertia that delays stopping and starting of the equipment. As the rotating motors are accelerated from rest to the operating speed, the resulting vibratory force passes through various undesirable frequencies that may excite the connecting or isolation elastic members in undesirable directions. The vibratory force passes through the same undesirable frequencies as the motors decelerate from operating speed to rest. For example, specific frequencies may cause isolation bounce, isolation rock, and rocking between the drive and the bed, among others. These undesirable motions cause extraneous movement of the bed, which may be particularly undesirable for applications requiring quick starting and stopping, such as precision feeders.

DETAILED DESCRIPTION

The embodiments described herein are not intended to be exhaustive or to limit the scope of the invention to the precise form or forms disclosed. The following embodiments have been chosen and described in order to best explain the principles of the invention and to enable others skilled in the art to follow its teachings. While the embodiments of vibratory process apparatus illustrated herein are commonly referred to as feeders or conveyors, it will be appreciated that the teachings of the present invention may be used in other applications, such as compaction tables, grinding mills, or other vibratory processing equipment.

Figure 1:
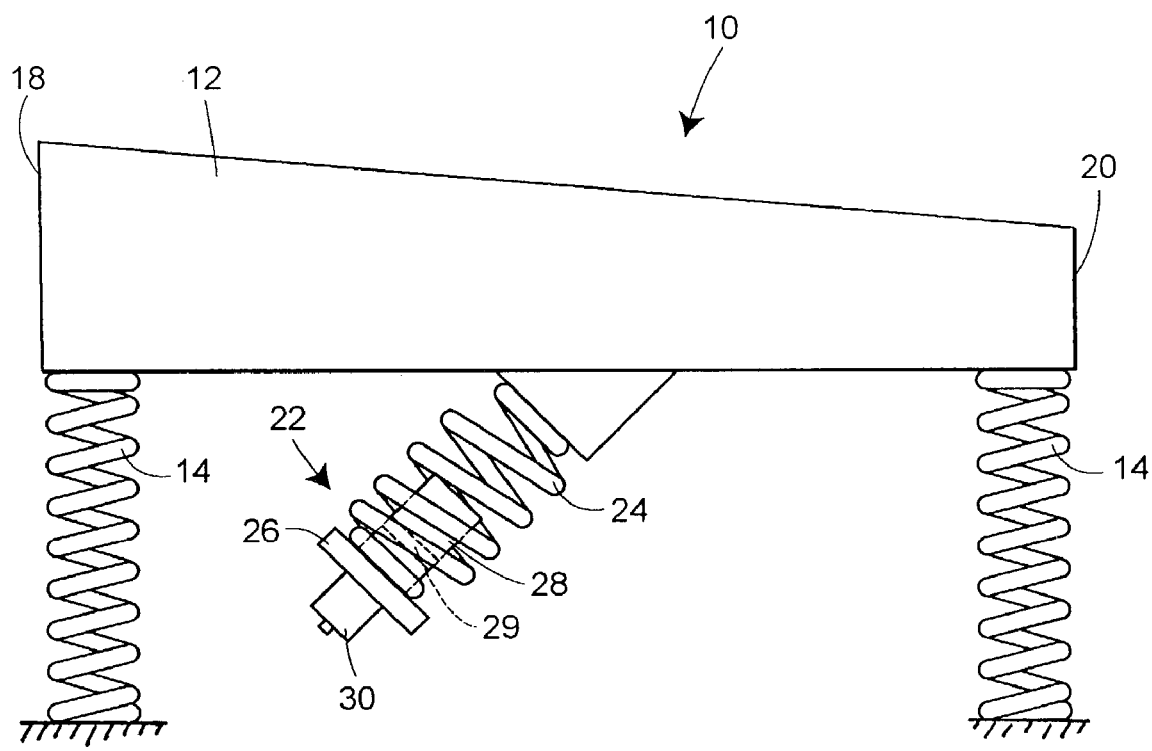
FIG. 1 is a side elevation of vibratory process apparatus constructed in accordance with the teachings of the present invention.

Referring now to the drawing, FIG. 1 illustrates a feeder 10 in accordance with the present disclosure. The feeder 10 includes a bed of the type generally well-known in the art, such as trough 12, which defines a work surface for receiving the work material to be processed. The trough 12 has a receiving end 18 and a discharge end 20, and is supported on elastic members such as springs 14 which isolate the bed from the surrounding terrain.

A vibratory drive 22 is elastically coupled to the trough 12 for generating a vibratory motion of the bed. In the embodiment illustrated at FIG. 1, the drive 22 is connected to the trough 12 by an elastic member such as spring 24. The drive 22 includes a base 26 supporting a linear actuator 28 and a tuning weight 30. While the linear actuator 28 is illustrated in FIG. 1 as being positioned inside the spring 24, it will be appreciated that the actuator may be positioned at other points on the base 26. Furthermore, while a single spring 24 is illustrated, the apparatus may include multiple springs extending between the base 26 and trough 12. Still further, the tuning weights 30 may be attached at any point on the base 26 without departing from the teachings of the present invention.

In operation, the linear actuator 28 generates a linear force that may be sinusoidal or non-sinusoidal over time. The linear force is amplified by the spring 24 and transferred to the trough 12, resulting in vibratory motion of the trough. Material placed on the work surface of the trough 12 will move in response to the vibratory motion of the trough 12. Because of the elastic connection between the trough 12 and drive 22, the illustrated embodiment would be considered two-mass system, defined herein as a vibratory apparatus having a working mass elastically coupled to an exciter mass.

In the apparatus of FIG. 1, the linear actuator 28 and spring 24 are angled to produce a bed motion that raises and translates the work material to the right, so that the work material will move from the receiving end 18 to the discharge end 20 of the trough 12. The orientation of the drive and or springs may be modified to move the work material in different manners. For example, the drive and springs may be oriented so that work material placed on the work surface is compacted. In general, the springs are aligned with the line of motion generated by the linear actuator 28 so that, when the actuator is at an operating frequency, the spring will be excited at a natural frequency in the desired direction, thereby to move the trough 12 in the desired motion.

The linear actuator 28 may be operated pneumatically or hydraulically. In the illustrated embodiment, the linear actuator 28 includes a reciprocating piston 29 inside the actuator to generate the vibratory force; however it will be appreciated that other sources of linear force in addition to the piston may be used. When the linear actuator 28 is pneumatic or hydraulic, the fluid pressure to the actuator 28 may be controlled to adjust not only the frequency at which the piston 29 reciprocates but also to adjust the force output of the actuator 28. Accordingly, both the frequency and amplitude of the vibratory force produced by the drive 22 may be adjusted. Furthermore, when fluid pressure is used to actuate the piston 29, the frequency and force output of the linear actuator 28 are infinitely adjustable.

Figure 2:
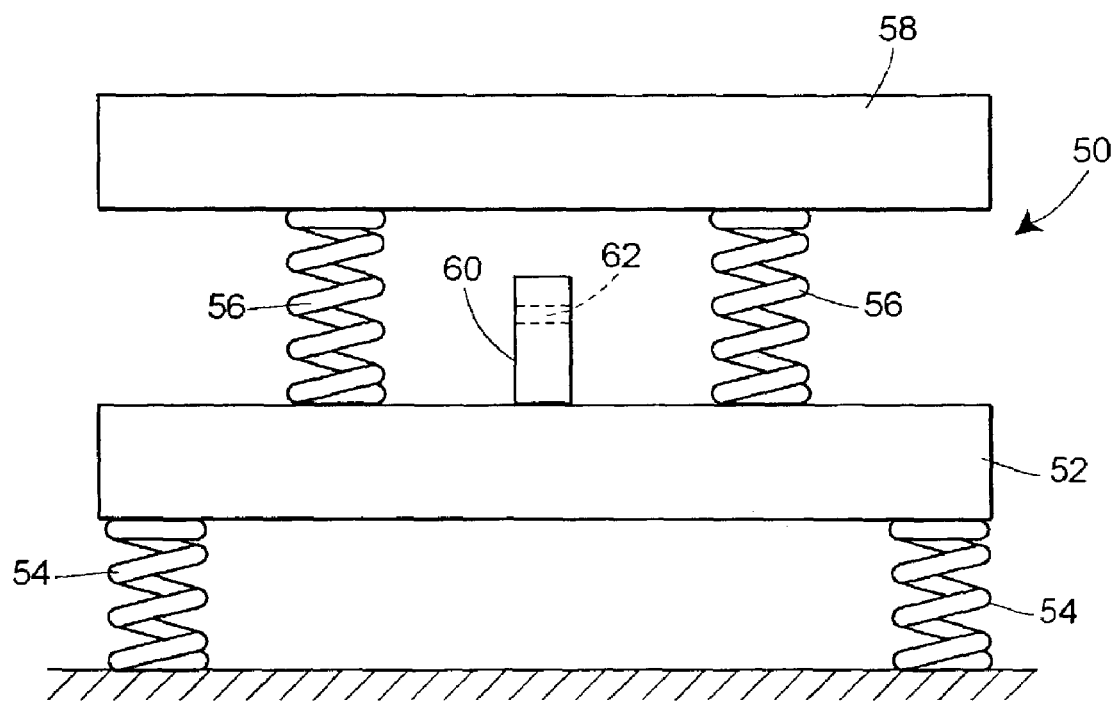
FIG. 2 is a side elevation of an alternative vibratory process apparatus constructed in accordance with the teachings of the present invention.

FIG. 2 illustrates an alternative embodiment of a vibratory apparatus 50 constructed in accordance with the teachings of the present invention. The vibratory apparatus 50 includes a base 52 supported by isolation springs 54 above the surrounding terrain. Amplifying springs 56 have first ends attached to the base 52 and second ends attached to a bed 58. The bed 58 defines a work surface for receiving a work material.

A linear actuator 60 is attached to the base 52 for generating a vibratory force. The linear actuator 60 may include a reciprocating piston 62 that is operated using pneumatic or hydraulic pressure. In operation, the reciprocating piston generates a force that is amplified by the springs 56 to create a vibratory motion of the bed 52.

The primary difference between the embodiments of FIGS. 1 and 2 is the location of the isolation springs. In the FIG. 1 embodiment, the isolation springs are coupled directly to the trough 12, while in the embodiment of FIG. 2, the isolation springs are coupled to the base 52. Apart from the isolation springs, the construction and operation of the two embodiments are quite similar.

The above embodiments use a linear actuator to produce a vibratory force in a two mass system. The force produced by the linear actuator acts in a single direction, and therefore the perpendicular force component (and the resulting detrimental effect on the desired vibratory motion) generated by conventional drives having rotating motors is minimized or eliminated. In addition, linear actuators weigh significantly less than electric motors and therefore the weight of the drive may be reduced. This is significant for applications in which the material to be processed is light, since the bed must weigh more than the drive for the apparatus to operate efficiently. Still further, when the linear actuator is operated by pressurized fluid, it is more finely adjustable than electric motors, thereby allowing greater control of the rate at which the objects are transported. Finally, the use of the linear actuator in a two mass system not only allows adjustment of frequency but also amplitude, thereby allowing further adjustment of the vibratory drive in a simple and inexpensive manner.

Numerous modifications and alternative embodiments of the invention will be apparent to those skilled in the art in view of the foregoing description. Accordingly, this description is to be construed as illustrative only and is for the purpose of teachings those skilled in the art the best mode of carrying out the invention. The details of the structure may be varied substantially without departing from the spirit of the invention, and the exclusive use of all modifications which come within the scope of the appended claims is reserved.

The invention claimed is:

1. A two mass vibratory feeder apparatus for transporting work material, the apparatus comprising:
   a bed defining a transport surface for receiving the work material;
   an elastic amplifier having a first end connected to the bed and a second end;
   a base connected to the amplifier second end; and
   a pneumatically operated linear actuator mounted on the base and having a housing and a reciprocating mass slidably disposed inside the housing, wherein the reciprocating mass is isolated from mechanical connection to any component outside of the housing and the housing and base are supported solely by the elastic amplifier, the reciprocating mass being responsive to pneumatic fluid pressure supplied to the actuator, wherein the pneumatic fluid pressure is controlled to generate a linear vibratory force that is amplified by the elastic amplifier thereby to move the bed in a vibratory motion and convey the work material along the transport surface in response to the vibratory motion of the bed.

2. The apparatus of claim 1, in which the reciprocating mass comprises a reciprocating piston that is actuated at a frequency and an amplitude.

3. The apparatus of claim 2, in which the frequency and amplitude of the piston are adjustable.

4. The apparatus of claim 1, further comprising an elastic isolator having a first end coupled to the bed and a second end coupled to surrounding terrain, thereby to isolate the bed from the surrounding terrain.

5. The apparatus of claim 1, in which the elastic amplifier comprises at least one spring.

6. A two mass vibratory feeder apparatus for transporting work material, the apparatus comprising:
   a bed defining a transport surface for receiving the work material;
   an elastic amplifier having a first end connected to the bed and a second end;
   a base connected to the amplifier second end; and
   a pneumatically operated linear actuator mounted on the base and having a housing and a reciprocating mass, wherein the reciprocating mass is isolated from fixed mechanical connection to any component and the housing and base are supported solely by the elastic amplifier, the reciprocating mass being responsive to pneumatic fluid pressure supplied to the actuator, wherein the pneumatic fluid pressure is controlled to generate a linear vibratory force that is amplified by the elastic amplifier thereby to move the bed in a vibratory motion and convey the work material along the transport surface in response to the vibratory motion of the bed.

7. The apparatus of claim 6, in which the reciprocating mass comprises a reciprocating piston that is actuated at a frequency and an amplitude.

8. The apparatus of claim 7, in which the frequency and amplitude of the piston are adjustable.

9. The apparatus of claim 6, further comprising an elastic isolator having a first end coupled to the bed and a second end coupled to surrounding terrain, thereby to isolate the bed from the surrounding terrain.

10. The apparatus of claim 6, in which the elastic amplifier comprises at least one spring.

* * * * *